United States Patent Office 3,165,115
Patented Jan. 12, 1965

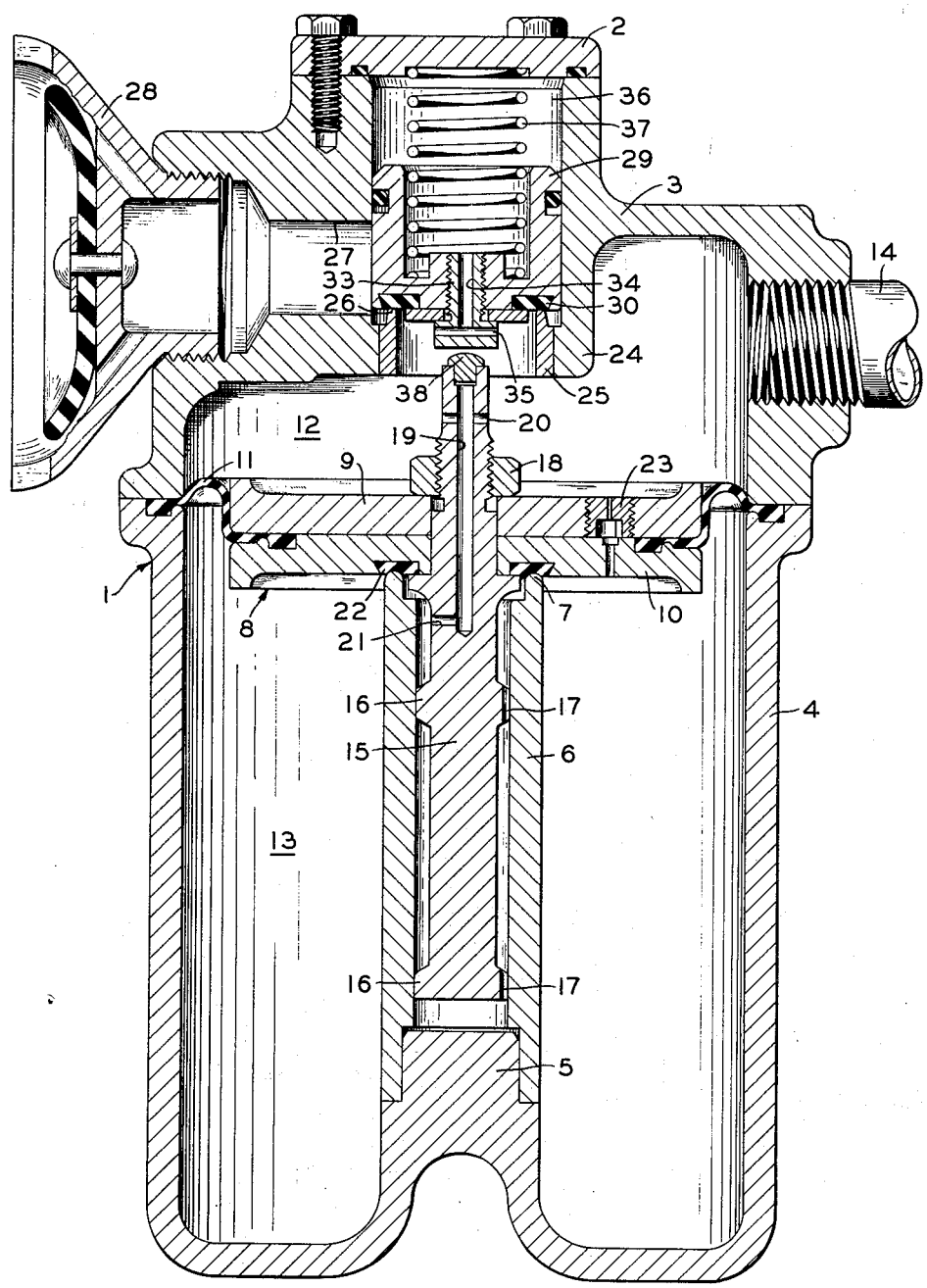

3,165,115
VENT VALVE DEVICE
Erik G. Erson, Export, Pa., assignor to Westinghouse Air Brake Company, Wilmerding, Pa., a corporation of Pennsylvania
Filed Aug. 16, 1962, Ser. No. 217,473
12 Claims. (Cl. 137—494)

This invention relates to a vent valve device and more particularly to a vent valve device for reduction of the pressure in the brake pipe of automatic air brake systems on railway trains to effect an emergency application of the brakes on the train.

Vent valves heretofore known and used for effecting emergency application on railway trains are of limited capacity and, under certain circumstances, are slow to respond to a pressure reduction impulse in the brake pipe. More recently freight cars have been made considerably longer thereby increasing the length and volume of the brake pipe in the train. An instance of such an application is the use of the piggy-back or tractor trailer trains wherein the length of a freight car has been doubled. In the event that one or more cars in succession in a train have the brake control valve, such as the familiar AB valve, cut out of operation, it is difficult for the brake pipe pressure reduction wave to propagate itself through the several cars sufficiently rapidly to cause the emergency vent valve on the first car immediately following the cutout cars to respond to the brake pipe pressure reduction.

Accordingly, it is an object of this invention to provide a simple and relatively low cost vent valve device which provides a sensitive response to reduction of brake pipe pressure at an emergency rate to insure emergency application of the brakes, while being reliably stabilized against undesired operation responsively to reduction of brake pipe pressure at a service brake application rate.

In accordance with the invention, the vent valve device comprises a casing having therein a fluid pressure responsive abutment such as a diaphragm type piston subject on the one side to the brake pipe pressure in a control chamber and on the other side to the opposing pressure in a balancing chamber, with a choke connecting the chambers for normal charging of the balancing chamber. The diaphragm piston has means for actuating a vent valve that is balanced to the pressure of the brake pipe, such that actuation of the vent valve communicates the control chamber to atmosphere whereby pressurized fluid in the brake pipe, which is connected to the control chamber, is vented to atmosphere to effect an emergency rate of pressure reduction. In addition, the diaphragm piston has a normally seated valve means that upon actuation connects the opposite sides of the piston (balancing chamber and control chamber) for controlled restricted communication to stabilize against an emergency rate of pressure reduction unless such rate of reduction has been initiated in the brake pipe.

Other objects and advantages of the invention will become more apparent from the following more detailed description of the invention.

In the accompanying drawing, the single figure is a side elevational view, partly in section and partly in outline, of a vent valve device.

Referring to the drawing, the vent valve device comprises a sectionalized casing indicated generally as 1, comprising a cover 2, an upper end section 3, and a main body section 4 secured together by any suitable means.

Extending upwardly and centrally into the inner chamber of main body section 4 from the bottom end portion thereof is a cylindrical boss 5, which boss 5 is suitably annularly recessed at its upper end portion to receive, as by a press fit, a vertically upwardly extending tubular guide member 6. The upper end portion of tubular guide member 6 is rounded to provide an annular valve seat 7 for a valve to be descriebd. A movable abutment, such as a diaphragm type piston 8, is suitably located between the upper end section 3 and the main body section 4. Diaphragm piston 8 comprises a centrally apertured upper follower disc 9 and a centrally apertured lower follower disc 10 which follower discs are suitably secured together as hereinafter described to clamp the inner peripheral edge of an annular resilient diaphragm 11 therebetween. The outer marginal edge of the diaphragm 11 is suitably clamped between the upper end section 3 and the main body section 4.

Movable abutment or diaphragm type piston 8 separates the sectionalized casing 1 into upper and lower chambers; wherein the upper chamber is hereinafter referred to as the control chamber 12, as defined by the upper surface of diaphragm type piston 8 and the inner wall surface of upper end section 3, and wherein the lower chamber is hereinafter referred to as the balancing chamber 13, as defined by the lower surface of diaphragm piston 8 and the main body section 3.

The control chamber 12 communicates at all times with a laterally extending conduit 14 which is adapted to be connected to the well-known and understood brake pipe (not shown) of the automatic air brake system on a railway vehicle and the pressure in which is controlled by the usual brake valve on the locomotive. It is to be understood that conduit 14 may be connected to other conduits or passageways or chambers in which the fluid pressure is controlled.

The central apertures of the upper and lower follower discs 9 and 10 receive an elongated longitudinally extending guide stem 15, which guide stem 15 has several longitudinally spaced radially extending guide flanges 16 on the lower portion thereof for slidingly engaging the inner wall surface of the bore of tubular guide member 6. Flanges 16 are grooved as at 17 to provide for pressure equalization throughout the bore of the tubular guide member 6. The upper end portion of guide stem 15 extends upwardly and outwardly beyond the diaphragm type piston 8 and is suitably threaded to receive a nut 18 to rigidly connect the guide stem 15 to the diaphragm type piston 8 and secure the followers 9 and 10 together.

Guide stem 15 has a bore 19 that extends along the longitudinal center line thereof from a point at the upper end portion of the stem to a point below the lower follower disc 10 of diaphragm type piston 8; such that a plurality of radially extending ports 20 in the upper end portion of guide stem 15 connect the control chamber 12 with the upper end of bore 19, and a radially extending restricted port 21 in guide stem 15 communicates with the lower end of bore 19, which restricted port 21 connects the clearance space provided between the inner wall surface of the bore of tubular member 6 and the outer wall surface of the guide stem 15 with the lower end of bore 19. The bottom surface of lower follower disc 10 of diaphragm type piston 8 is suitably annularly recessed, which recess receives a flat annular valve 22 which is adapted to abuttingly engage the annular valve seat 7 on the upper end of tubular guide member 6. Movement of diaphragm type piston 8 relative to the stationary tubular guide member 6 moves valve 22 upwardly relative to the annular valve seat 7 to provide communication between the balancing chamber 13 and the control chamber 12 through the clearance space provided between the inner wall surface of the bore of tubular member 6 and the outer wall surface of guide stem 15, the bore 19, and ports 20, 21.

The upper and lower follower discs 9 and 10 have a restricted orifice or choke fitting 23 spaced radially outwardly from the longitudinal center line thereof. via which restricted communication is provided between the control chamber 12 and the balancing chamber 13 to allow normal charging of the balancing chamber 13 from the control chamber 12 as well as to allow normal escape of air from the balancing chamber 13 to the control chamber 12 during normal fluctuations of the charged brake pipe pressure in control chamber 12.

The upper end section 3 of casing 1 has a downwardly extending cylindrical member 24, the lower inner diameter end of which receives an annular bushing 25 secured integral therewith as by a press fit. The upper end portion of cylindrical bushing 25 terminates in a sealing bead 26 to provide a valve seat for a valve to be described. A laterally extending bore 27 in the upper end portion of upper end section 3 has one end communicating directly to atmosphere through a protected exhaust port fitting 28 of well-known design, and the other end opening into the cylindrical member 24. Slidably received within the bore of the cylindrical member 24 is a piston valve 29 having an annular valve 30 located on its lower bottom surface. Annular valve 30 has an outer seated portion subject to the atmospheric pressure and an inner seated portion which engages the sealing bead 26 as well as having a portion thereof subject to the pressurized fluids in control chamber 12. With annular valve 30 seated on sealing bead 26, communication between brake pipe chamber 18 and laterally extending bore 27 is blocked.

Piston valve 29 has a threaded bore extending centrally axially therethrough to receive a threaded member 33 which has a bore 34 extending longitudinally therein communicating with a laterally extending passageway 35 at its lowermost end to connect the control chamber 12 with the chamber defined by the upper end section 3 and the inner wall surface of the piston valve 29, which chamber is hereinafter referred to as a loading chamber 36. The inner bottom surface of piston valve 29 is suitably annularly recessed to provide a seat for a closed end helical spring 37 located in the loading chamber 36 whereby closed end spring 37 biases piston valve 29 downwardly into engagement with the sealing bead 26 on annular bushing 25. The uppermost end portion of guide stem 15 has a projection 38 substantially in alignment with the central portion of the piston valve 29 such that upward movement of the diaphragm type piston 8 causes the projection 38 to engage and displace the piston valve 29 upwardly relative to the annular bushing 25 to unseat piston valve 29 from the seat 26 to open communication between the control chamber 12 and the laterally extending bore 27.

In operation, the conduit 14 communicates directly with the control chamber 12 to charge the control chamber 12 to the same pressure that exists in the brake pipe of the unit to be serviced. On charging of the control chamber 12, the diaphragm type piston 8 moves downwardly and seats the valve 22 on the seat 7 with the restricted orifice 23 allowing the balancing chamber 13 to be charged to the same pressure as existing in the control chamber 12. Orifice 23 allows the restricted flow of pressurized air from the balancing chamber 13 back into the brake pipe chamber for normal brake pipe pressure fluctuations.

During a service brake application, a service rate of pressure reduction in the conduit 14 will be effected in a well-known manner by brake valve means (not shown) on the locomotive which results in a corresponding rate of reduction in fluid pressure in control chamber 12. Since orifice 23 restricts the flow of fluid under pressure from balancing chamber 13 to the control chamber 12, a differential in pressure results between the respective chambers 12 and 13 to thereby cause the higher pressure in balancing chamber 13 to act on diaphragm type piston 8 and move the diaphragm type piston 8 upwardly out of a normal position in which it is shown in the drawing along with the guide stem 15. Such action unseats valve 22 from the seat 7 to thereby permit the escape of pressurized air from the balancing chamber 13 via bore 19, ports 20, 21 and to the control chamber 12 to effect an equalizing action therebetween. During such a service rate of reduction in brake pipe pressure, port 21 provides for a restricted flow of pressurized fluid from balancing chamber 13 to control chamber 12 to stabilize the movement of diaphragm type piston 8. The rate at which pressure reduction is made in the brake pipe governs the rate of reduction effected in control chamber 12, so that with a differential in pressures existing between chambers 12 and 13, annular valve 22 of diaphragm type piston 8 remains unseated until the respective pressure in chambers 12 and 13 are leveled off. During such a service rate of reduction in pressure in control chamber 12, the rate of reduction is not sufficient to displace the diaphragm type piston 8 upwardly a sufficient distance to displace or unseat the annular valve 30 of piston valve 29.

Upon an emergency rate of brake pipe reduction, a sufficient differential in the pressures in control chamber 12 and the balancing chamber 13 results to thereby move the diaphragm type piston 8 upwardly at a relatively rapid rate to cause the projection 38 on the upper end of the guide stem 15 to unseat the piston valve 29 to thereby connect the control chamber 12 directly to bore 27 and thereby vent the pressurized fluids from control chamber 12 to atmosphere. Bore 27 being directly connected to atmosphere vents the pressurized air from the control chamber 12 at a fast rate to effect a rapid reduction of air pressure in the brake pipe (not shown) since the brake pipe is connected to conduit 14 and the control chamber 12. It is to be understood that since the piston valve 29 has the passageway 35 and bore 34 connecting the control chamber 12 to loading chamber 36, the pressurized fluid acts on the entire cross-sectional area of the piston valve 29, whereas with annular valve 30 having its inner seated portion in engagement with the sealing bead 26 and with the outer unseated portion 31 subject to atmospheric pressure, a greater force is developed to maintain the piston valve 29 seated due to the difference in areas subject to the same pressures, which when taken with spring 37 provides a positive means for controlling the force requirement to unseat the piston valve 29 for an emergency rate of reduction. Upon such displacement or unseating of piston valve 29, the escape of pressurized air from the loading chamber 36 through bore 34 and passageway 35 is relatively fast since there is no restriction to the flow therefrom and since the volume to be drained is relatively small. Such upward movement of the diaphragm type piston 8 although unseating the annular valve 22 from the seat 7 which communicates the control chamber 12 and the balancing chamber 13 does not vent the pressurized fluid from the balancing chamber 13 to control chamber 12 at a sufficient rate to restore the rapid reduction of air pressure from the control chamber 12. Pressurized air from the balancing chamber 13 continues to flow into the control chamber 12 via orifice 23 and restricted port 21 until the fluid in the brake pipe and control chamber 12 is fully vented. The rate of reduction in pressurized air from the balancing chamber 13 to the control chamber 12 is slower than the rate of reduction occurring from the loading chamber 36 to control chamber 12 and to atmosphere via bore 27. As an example of the relative times required to effect such reductions, loading chamber 36 takes one-tenth of a second to reduce to atmospheric pressure upon actuation of piston valve 29, whereas balancing chamber 13 takes one minute to vent to atmospheric pressure to thereby equalize the pressures between the balancing chamber 13 and the control chamber 12. Since the loading chamber 36 is vented before balancing chamber 13, the differential pressure existing across diaphragm type piston 8 maintains the projection 38 in engagement with piston valve 29 until the fluid in control chamber 12 is fully vented, at which time spring 37 acting on piston valve 29 biases piston valve 29 into seating engagement with the sealing bead 26 so that thereafter upon introduction of pressurized fluid into the brake pipe and the control chamber 12, the pressurized fluid exerts a downward force on diaphragm piston 9 to thereby seat the annular valve 22 on valve seat 7.

It should be understood, of course, that the foregoing disclosure relates to only a preferred embodiment and that numerous modifications or alterations may be made therein without departing from scope of the invention as set forth in the appended claims.

Having now described the invention, what I claim as new and desire to secure by Letters Patent is:

1. A vent valve device comprising:
   (a) a casing having a control chamber communicable with a pressure controlled conduit via which fluid under pressure may be applied thereto to charge said control chamber and via which fluid pressure may be released to reduce the pressure in said control chamber,
   (b) said casing having a balancing chamber,
   (c) throttling means connecting said chambers for charging said balancing chamber with pressurized fluid from said control chamber,
   (d) movable abutment means subject to opposing pressure from said control chamber and said balancing chamber for movement in either of opposite directions,
   (e) a normally seated valve operatively connected to said movable abutment means and unseated in response to movement of said movable abutment means upon the occurrence of a reduction in pressure in said control chamber at a rate above a certain rate to effect rapid venting to atmosphere of fluid under pressure from said control chamber and such pressure controlled conduit, and
   (f) valve means comprising cooperating members on said movable abutment means and said casing for opening a restricted passageway between said balancing chamber and said control chamber upon movement of said movable abutment means in response to the differential of opposing pressures thereon resulting from the occurrence of a reduction in pressure in said control chamber at a sufficient rate in relation to the size of the throttling means and to close said restricted passageway upon movement of said movable abutment means in a direction opposite to said last-mentioned movement in response to a predominating pressure in said control chamber over pressure in said balancing chamber,
   (g) said certain rate of pressure reduction in the control chamber being at least a rate, in relation to the combined flow capacity of both the throttling means and the restricted passageway, as to develop sufficient differential pressures on said movable abutment means to effect unseating of said normally seated valve.

2. A vent valve device as claimed in claim 1, in which said normally seated valve comprises a piston valve operable in a bore in said casing and biased normally to seated position on an annular valve seat to close communication through a port connecting said control chamber to a port connected to atmosphere, said piston valve having a passageway therein via which pressure in said control chamber acting on the face of the said piston valve equalizes with the pressure in a loading chamber in said bore at the back of said piston valve.

3. A vent valve device as claimed in claim 2, in which the inner seated area of said piston valve on said annular valve seat is less than the area of said bore to provide a differential fluid force on said piston valve to assist in maintaining said piston valve normally seated which is dissipated as soon as said piston valve is unseated thereby to stabilize the operation of said piston valve.

4. A vent valve device as claimed in claim 1, in which the said valve means comprises:
   (a) an annular valve seat formed on the end of a tubular member forming part of said casing and said movable abutment means carries an annular valve member engageable with said annular valve seat,
   (b) said movable abutment means has a restricted passageway therethrough open at one end to said control chamber and at the other end within the inner seated area of said annular valve member, and
   (c) said restricted passageway being opened upon unseating of said annular valve member from said annular valve seat to effect a controlled reduction of pressure in the balancing chamber therethrough to said control chamber.

5. A vent valve device having:
   (a) a housing,
   (b) said housing having a control chamber and a balancing chamber with said control chamber adapted to be connected to a conduit in which fluid pressure may be externally controlled, the variations of fluid pressure in the conduit being reflected in said control chamber,
   (c) a movable abutment means interposed between said chambers,
   (d) a restricted orifice in said movable abutment means via which fluid under pressure may flow to charge said balancing chamber from said control chamber,
   (e) valve means on said movable abutment means normally seated on a valve seat formed on a portion of said housing,
   (f) a restricted orifice means through said movable abutment means connecting said control chamber with said balancing chamber upon displacement of said valve means from said valve seat for venting the pressurized fluid from said balancing chamber to said control chamber upon a differential in pressure existing between said balancing chamber and said control chamber conditioned by a reduction in pressure in said control chamber at a certain rate in relation to the size of said restricted orifice, and
   (g) a valve device slidably mounted in said housing cooperative therewith for venting to atmosphere said control chamber upon actuation by said movable abutment means upon a sufficient differential in pressure existing between said chambers conditioned by a reduction in pressure in said control chamber at a rate greater than said certain rate, said greater rate being at least a rate, in relation to the combined flow capacity of both said restricted orifice and said restricted orifice means, as to develop said sufficient differential in pressure between said chambers.

6. A vent valve device as set forth in claim 5, wherein said movable abutment means has a stem portion cooperative with guide means on said housing for guiding said movable abutment means, said stem portion has means thereon for maintaining balanced pressure forces on said stem portion.

7. A vent valve device as set forth in claim 5, wherein said movable abutment means is a diaphragm piston.

8. A vent valve device as set forth in claim 5, wherein:
   (a) said valve device is slidably located in the upper portion of said housing and cooperative therewith to define a loading chamber,
   (b) said housing having a seat means for limiting the movement of said valve device, and
   (c) said valve device having a passageway for connecting said loading chamber to said control chamber for equalizing the pressure in said loading chamber and said control chamber.

9. A vent valve device as set forth in claim 8, wherein said valve device is aligned for engagement by a projection portion on said movable abutment means upon a predetermined rate of reduction of fluid pressure in said control chamber, said housing having a conduit for connecting said control chamber to atmosphere upon displacement of said valve device by said projection.

10. A vent valve device having:
(a) a housing,
(b) said housing having a control chamber and a balancing chamber, said control chamber being subjectable to variable externally controlled fluid pressure,
(c) a movable abutment interposed between said chambers,
(d) a first restricted orifice means in said movable abutment equalizing the pressures between said balancing chamber from said control chamber,
(e) a valve member on said movable abutment normally cooperating with a portion of said housing wherein said valve member seats on said housing portion,
(f) at second restricted orifice means on said movable abutment for connecting said balancing chamber to said control chamber upon unseating of said valve member from said housing portion for venting said balancing chamber to said control chamber upon actuation of said movable abutment conditioned upon a reduction in pressure in said control chamber at a rate up to a certain maximum rate, said certain maximum rate being such, in relation to the size of said first restricted orifice means, as to produce a sufficient differential in the pressures acting on opposite sides of said movable abutment to cause actuation thereof,
(g) valve means mounted in said control chamber cooperative with said housing to define a loading chamber,
(h) said valve means operative for venting flow from said control chamber to atmosphere on actuation thereof,
(i) said valve means cooperative with stop means on said housing for limiting the movement of said valve means,
(j) said valve means having an orifice for connecting said control chamber to said loading chamber thereby equalizing said loading chamber to the pressure of said control chamber to maintain said valve means in de-actuated condition, and
(k) means on said movable abutment for actuating said valve means upon further actuation of said movable abutment in response to a reduction of pressure in said control chamber at a rate greater than said maximum rate to vent said control chamber to atmosphere, said greater rate being at least a rate, in relation to the combined flow capacity of both said first restricted orifice means and said second restricted orifice means, as to develop sufficient differential pressures on said movable abutment means to cause said further actuation thereof.

11. A vent valve device as set forth in claim 10, wherein said loading chamber houses biasing means operatively engaging said valve means for augmenting the pressurized fluid in said loading chamber for maintaining said valve means in de-actuated position.

12. A vent valve device comprising:
(a) a housing,
(b) a movable abutment mounted in said housing dividing said housing into a first and second chamber wherein said first chamber is adapted to be connected to a brake pipe via which fluid under pressure may be supplied to said first chamber for charging said first chamber and via which fluid pressure may be released for reducing the pressure in said first chamber according to the pressure in such brake pipe,
(c) an orifice in said movable abutment for regulating the flow of pressurized fluid between said chambers,
(d) passage means in said movable abutment cooperative with a first valve means on said movable abutment for connecting said first and said second chambers upon actuation of said movable abutment in a first direction,
(e) said movement in said first direction being responsive to movement of said movable abutment caused by a differential of opposing pressures thereon occurring when pressure in said first chamber is reduced at a rate up to a certain rate thereby venting pressurized fluid to said first chamber from said second chamber, via said passage means, said certain rate being such, in relation to the size of said orifice, as to produce said pressure differential acting on said movable abutment,
(f) said first valve means cooperative with a portion of said housing to block connection between said first and second chambers through said passage means upon movement of said movable abutment in a second direction which is opposite in direction to said first direction,
(g) a second valve means located in the upper portion of said housing cooperative with a portion thereof to define a third chamber,
(h) passageway means in said second valve means for pressurizing said third chamber to the pressure of said first chamber,
(i) resilient means in said third chamber operatively engaging said second valve means for biasing said second valve means into inoperative position,
(j) exhaust port means in said housing connectable to said first chamber upon movement of said second valve means into operative position, and
(k) means on said movable abutment for moving said second valve means from inoperative to operative position upon reduction of pressure in said first chamber at a rate above said certain rate,
(l) said rate above said certain rate being such, in relation to the flow capacity of both said orifice and said passage means, as to develop sufficient pressure differential acting on said movable abutment for causing further movement thereof in said first direction for effecting operation of said second valve means to its said operative position.

References Cited in the file of this patent
UNITED STATES PATENTS

| | | |
|---|---|---|
| 2,260,485 | Safford | Oct. 28, 1941 |
| 2,861,587 | Hursen | Nov. 25, 1958 |
| 2,962,039 | Shand et al. | Nov. 29, 1960 |